(12) United States Patent
Adeyelure et al.

(10) Patent No.: US 8,726,982 B2
(45) Date of Patent: May 20, 2014

(54) METHOD OF PRODUCING GASEOUS AND LIQUID COMPONENTS FROM ONE OR MORE MULTI-PHASE STREAMS AND APPARATUS THEREFOR

(75) Inventors: Adekunle Adeyelure, The Hague (NL); Robert John Rockall, The Hague (NL)

(73) Assignee: Shell Oil Company, Houston, TX (US)

( * ) Notice: Subject to any disclaimer, the term of this patent is extended or adjusted under 35 U.S.C. 154(b) by 825 days.

(21) Appl. No.: 12/989,678

(22) PCT Filed: Apr. 24, 2009

(86) PCT No.: PCT/EP2009/054951
§ 371 (c)(1),
(2), (4) Date: Apr. 13, 2011

(87) PCT Pub. No.: WO2009/133028
PCT Pub. Date: Nov. 5, 2009

(65) Prior Publication Data
US 2011/0180253 A1 Jul. 28, 2011

(30) Foreign Application Priority Data
Apr. 28, 2008 (EP) .................................. 08155296

(51) Int. Cl.
*E21B 21/06* (2006.01)
*B01D 19/00* (2006.01)

(52) U.S. Cl.
USPC ................. 166/75.12; 166/369; 166/250.01; 95/241; 96/155

(58) Field of Classification Search
USPC .............. 166/335, 250.01, 369, 75.12, 242.1, 166/242.3, 243; 95/241, 253, 260, 254; 96/155, 204, 206, 182
See application file for complete search history.

(56) References Cited

U.S. PATENT DOCUMENTS

| | | | |
|---|---|---|---|
| 3,252,439 A | 5/1966 | Shatto et al. ...................... 114/5 |
| 4,519,815 A * | 5/1985 | Buls et al. ........................ 95/259 |
| 4,736,482 A * | 4/1988 | Lankston ................. 15/104.062 |
| 5,232,475 A | 8/1993 | Jepson ............................. 55/36 |
| 5,288,312 A | 2/1994 | Payne et al. ..................... 96/158 |
| 6,129,150 A | 10/2000 | Lima ............................. 166/357 |
| 6,132,494 A * | 10/2000 | Kjos et al. ....................... 95/243 |
| 6,533,032 B1 * | 3/2003 | Seixas et al. ..................... 166/70 |
| 7,867,382 B2 * | 1/2011 | Droughton .................... 208/306 |

(Continued)

FOREIGN PATENT DOCUMENTS

| | | | |
|---|---|---|---|
| DE | 10310002 | 9/2004 | ............ B01D 19/00 |
| EP | 254503 | 1/1988 | ................ F17D 3/08 |

(Continued)

*Primary Examiner* — Jennifer H Gay
*Assistant Examiner* — Elizabeth Gitlin

(57) ABSTRACT

A method and apparatus for producing gaseous and liquid components from one or more multi-phase streams in one or more pipelines. The method includes passing a first multi-phase stream along a first pipeline, and passing the first multi-phase stream through a first slugcatcher system to provide a first gaseous component stream and at least one first liquid component stream. The method also includes selectively opening a first branch pipeline from the first pipeline upstream of the first slugcatcher system to pass at least a fraction of the first multi-phase stream through the first branch pipeline to provide a first branch multi-phase stream, and passing at least a fraction of the first branch multi-phase stream to a first gas/liquid separator to provide an overhead gaseous stream and a bottom liquid stream.

20 Claims, 4 Drawing Sheets

(56) References Cited

U.S. PATENT DOCUMENTS

| | | |
|---|---|---|
| 8,480,788 B2 * | 7/2013 | Balk .................................. 95/39 |
| 2006/0272983 A1 * | 12/2006 | Droughton et al. ........... 208/177 |
| 2010/0147745 A1 * | 6/2010 | Den Boestert et al. ......... 208/91 |
| 2011/0061739 A1 * | 3/2011 | Balk ................................. 137/1 |

FOREIGN PATENT DOCUMENTS

| | | | |
|---|---|---|---|
| EP | 331295 | 9/1989 | ............. E21B 43/36 |
| GB | 451905 | 8/1936 | |
| WO | WO03067146 | 8/2003 | ................ F17D 1/00 |
| WO | WO2005040670 | 5/2005 | ................ F17D 3/01 |
| WO | WO2007060228 | 5/2007 | ............. E21B 43/34 |

\* cited by examiner

METHOD OF PRODUCING GASEOUS AND LIQUID COMPONENTS FROM ONE OR MORE MULTI-PHASE STREAMS AND APPARATUS THEREFOR

PRIORITY CLAIM

The present application claims priority to European Patent Application 08155296.0 filed 28 Apr. 2008.

FIELD OF THE INVENTION

This invention relates generally to a method of producing gaseous and liquid component streams from one or more multi-phase streams, and an apparatus therefor.

BACKGROUND OF THE INVENTION

In the field of oil production and transmission, flows of two-phase mixtures (e.g. gas-liquid mixtures) (hereinafter referred to as "multi-phase flows") or other mixtures of constituent parts having varying densities (e.g. liquid-liquid mixtures, gas-liquid mixtures, gas-gas mixtures) (hereinafter referred to as "mixture flows") are commonly encountered. This is especially true in production carrier pipelines conveying oil mixtures from a producing well. Producing wells, for example, may contain a mixture of oil, water and various gases that are extracted as a mixture flow through a pipeline. These flows must be received by oil handling systems and separated into constituent or component parts based on phase or density for treatment and subsequent distribution to end users.

It is often desirable for the separation of the components of a mixture, particularly those of different phases, to occur prior to the transmission thereof through significant lengths of pipelines. Early multi-phase or mixture flow separation enables mechanical devices functioning within oil production and transmission systems to manage component flows each having substantially only one phase or range of densities. Examples of such mechanical devices include compressors utilised for compressing materials in gaseous states and pumps for moving the flow of liquids. By managing component flow of a single phase or density range, these mechanical devices can be engineered for optimum performance while reducing stresses placed on respective oil handling systems. Thus, compressors are normally designed to handle gaseous streams and may be damaged by the presence of liquids. Similarly pumps are normally designed to handle liquid streams and may be damaged by the presence of gasses.

However, multi-phase and mixture flow separation may not be a simple matter. Firstly, many producing wells are positioned at remote locations and in harsh environments, such as on a deep sea floor. In those situations, achieving separate component part flows shortly after the corresponding multi-phase flow or mixture flow (especially two-phase flow) leaves the well requires a separator to be located where it is not easy to install nor easy to access when system maintenance is needed. Further, most conventional systems that achieve efficient component separation may be quite bulky and heavy, reducing the desirability of using such separation systems on offshore platforms where weight and space considerations are a high priority.

In those situations where multi-phase or mixture flow separation is not possible at or near the well site, the oil, water and various gases that are extracted from the well must be transported along pipelines, sometimes over significant distances, before they can be treated.

A fluid flows along a pipeline as a result of the pressure difference between the upstream and downstream ends of the pipe. The flow of a two-phase gas-liquid mixture along a pipeline can lead to an uneven distribution of the components of the multi-phase mixture that interferes with the free flow of the gas and creates undesirable cyclic flow characteristics, referred to as a 'slug flow'. Slug flow can result in significant increases in pressure drop, and can become a limiting factor in maximising the length of a pipeline, the usable range of flow rate and the minimum delivery pressure of the pipeline.

Slugs can be formed in a number of ways. Liquid may be formed in a multi-phase or mixture flow by condensation as a result of a pressure drop across a well-head choke valve. In addition, multi-phase flow or mixture flow can experience frictional losses and heat losses to ambient temperature as it travels along the pipeline. These changes in the conditions can alter the equilibrium of the components in the pipeline, leading to for instance, gas condensate formation in a partially conditioned gaseous phase and gas flashing in a partially stabilised condensate phase, producing so-called 'hydrodynamic slugging'.

Slugs may also be formed by other factors such as pipelines which have many changes in elevation. Liquid components can accumulate at the low points of the upward sections of pipelines until the full pipeline cross section at the bottom of the slope becomes blocked with liquid components, forming a 'terrain-induced slug'.

In addition, a multi-phase flow will form an equilibrium between liquid and gaseous components for a particular flow rate. The liquid component of the flow will have a lower velocity than the gaseous component and therefore a longer residence time in the pipeline. A particular level of liquid or "hold-up" is therefore established in the pipeline. An increase in multi-phase flow, such as when additional well-head manifolds are being brought on-line, will lead to the formation of a new equilibrium between the gaseous and liquid components. The level of hold-up in the pipeline will decrease towards a new equilibrium level, generating surges of liquid, known as 'flow-induced slugs' in the process.

As a result of slug formation, surges of components of the multi-phase or mixture flow (e.g. gas or liquid) may occur at any given point along the transmission pipeline, impeding efficient multi-phase or mixture flow and causing increased stresses on mechanical devices of the transmission system.

However, slugs are frequently composed of valuable liquid hydrocarbons, and it is economically desirable to have these hydrocarbons available for processing. Consequently facilities for receiving and treating a slug may be present near the downstream end of a pipeline. One such facility is a 'slug-catcher' which can provide a separation of the gas and liquid components of the multi-phase flow before further treatment. The volume of the slug catcher is conventionally dimensioned to collect the largest anticipated slug size.

Pipeline inspection and maintenance may induce unusually large volumes of fluid. For example, a pipeline must be periodically cleaned to remove liquid such as partial condensate, and debris such as sand and pipeline corrosion products, which have accumulated in the pipeline. It is common to introduce "spheres" or "pigs" (hereinafter referred to as "pigs") into the pipeline to aid in accumulating the liquids and debris into masses, or 'pig-induced slugs', which can be pushed along the pipeline ahead of the pig, which is propelled by the flowing gas. The pigging of a pipeline is essential maintenance because it allows periodic inspection and maintenance of the pipeline. In some cases, pigging reduces liquid hold-up in the pipeline and therefore increases the pipeline's capacity for gas flow.

The pigging of a pipeline can produce slugs of significantly larger size than hydrodynamic-, terrain- or flow-induced slugs. This may exceed the handling capacity of the slug catcher and can lead to the tripping of downstream processing facilities. It is not always economic to simply increase the size the slug catcher to deal with pig-induced slugs because pig-induced slugs may be 4-5 times the volume of hydrodynamic-, terrain- or flow-induced slugs.

WO 03/067146 A1 discloses a subsea pipeline for multi-phase flow having an integrated slug-catcher, in which the pipeline has a branch line such that the pipeline and branchline together contain at least one upstream and two downstream ends. The connection of the branch line to the subsea pipeline occurs at a low point of the subsea pipeline and the connection is downwards directed such that the branch line can transport in particular the liquid phase and act as slug-catcher.

WO 03/067146 discloses that the branch line may contain a separator in the form of collecting tanks for liquid. No provision is made for the provision of an overhead gaseous stream from the separator.

EP 0331295 A1 discloses a system for separation of gas, from a two-phase flow of oil and gas, in a secondary riser. The oil and gas is transported in a pipeline having an upstream end connected to an oil well at the seabed. A main riser for transporting oil is connected to an oil storing tank on a platform. A secondary riser is connected via a T-junction to the pipeline at a distance from the main riser and leads to a gas scrubber on the platform. The secondary riser contains a regulating valve which is operated in such a way to keep the interface between the gas and the oil at a relatively constant location in the pipeline between the T-junction and the main riser. The oil and gas are separated at the T-junction, where the gas components pass into the secondary riser and the oil components pass into the pipeline downstream of the T-junction and into the main riser. The pipeline between the T-junction and the main riser is slightly sloped so that a liquid seal is formed in the riser. The regulating valve, by venting the gas, regulates the pressure in the pipeline and in the main riser. The main riser will contain fluid which is 100% oil and the oil/gas interface at all times will be located between the T-junction and the main riser.

However, the system of EP 0331295 A1 is unsuitable for providing a continuous output of gas, for instance during pigging of the pipeline.

SUMMARY OF THE INVENTION

In a first aspect, the present invention provides a method of producing gaseous and liquid components from one or more multi-phase streams in one or more pipelines comprising at least the steps of:
(a) passing a first multi-phase stream along a first pipeline;
(b) passing the first multi-phase stream through a first slug-catcher system to provide a first gaseous component stream and at least one first liquid component stream;
(c) selectively opening a first branch pipeline from the first pipeline upstream of the first slugcatcher system to pass at least a fraction of the first multi-phase stream through the first branch pipeline to provide a first branch multi-phase stream; and
(d) passing at least a fraction of the first branch multi-phase stream to a first gas/liquid separator to provide an overhead gaseous stream and a bottom liquid stream.

The first pipeline, the first slugcatcher system, the branch pipeline and the first gas/liquid separator can receive the multi-phase stream. The first slugcatcher system and the gas/liquid separator can both output a gaseous component stream, to ensure a continuous gas supply.

In an embodiment, at least a first pig is passed down at least the first pipeline to create at least one pig-slug mass, and at least the first branch pipeline is selectively opened when the at least first pig is downstream of at least the first branch pipeline. The slug-catcher system can provide the first gaseous component stream before the pig reaches the first branch. As the first branch pipeline is selectively opened when the first pig is downstream of the first branch pipeline, the gas/liquid separator will receive part of the first multi-phase stream and can provide the overhead gaseous component stream.

In a further aspect, the present invention provides a method of accommodating a first pig-slug mass in a first pipeline upstream of a first slugcatcher system comprising at least the steps of:
(a) passing a first multi-phase stream along a first pipeline and through a first slugcatcher system;
(b) passing a first pig down the first pipeline to create a first pig-slug mass in the first pipeline;
(c) passing at least a fraction of the first multi-phase stream upstream of the first pig-slug mass to a first branch pipeline to provide a first branch multi-phase stream; and
(d) passing the first branch multi-phase stream, to a first gas/liquid separator to provide an overhead gaseous stream and a bottom liquid stream.

In a yet further aspect, the present invention provides an apparatus for separating and recovering gaseous and liquid components from one or more multi-phase streams in one or more pipelines at least comprising:
(a) a first pipeline able to carry a first multi-phase stream connected downstream to a first slugcatcher system able to separate and recover a first gaseous component as a first gaseous component stream and at least a first liquid component as a first liquid component stream from at least the first multi-phase stream; and
(b) a first branch pipeline from the first pipeline upstream of the first slugcatcher system able to selectively pass at least a fraction of the first multi-phase stream from the first pipeline to a first gas/liquid separator, said gas/liquid separator able to provide an overhead gaseous stream and a bottom liquid stream from at least the first multi-phase stream.

BRIEF DESCRIPTION OF THE DRAWINGS

Embodiments and examples of the present invention will now be described by way of example only with reference to the accompanying non-limiting drawings in which.

DETAILED DESCRIPTION OF THE INVENTION

For the purpose of this description, a single reference number will be assigned to a line as well as a stream carried in that line.

Figure 1:
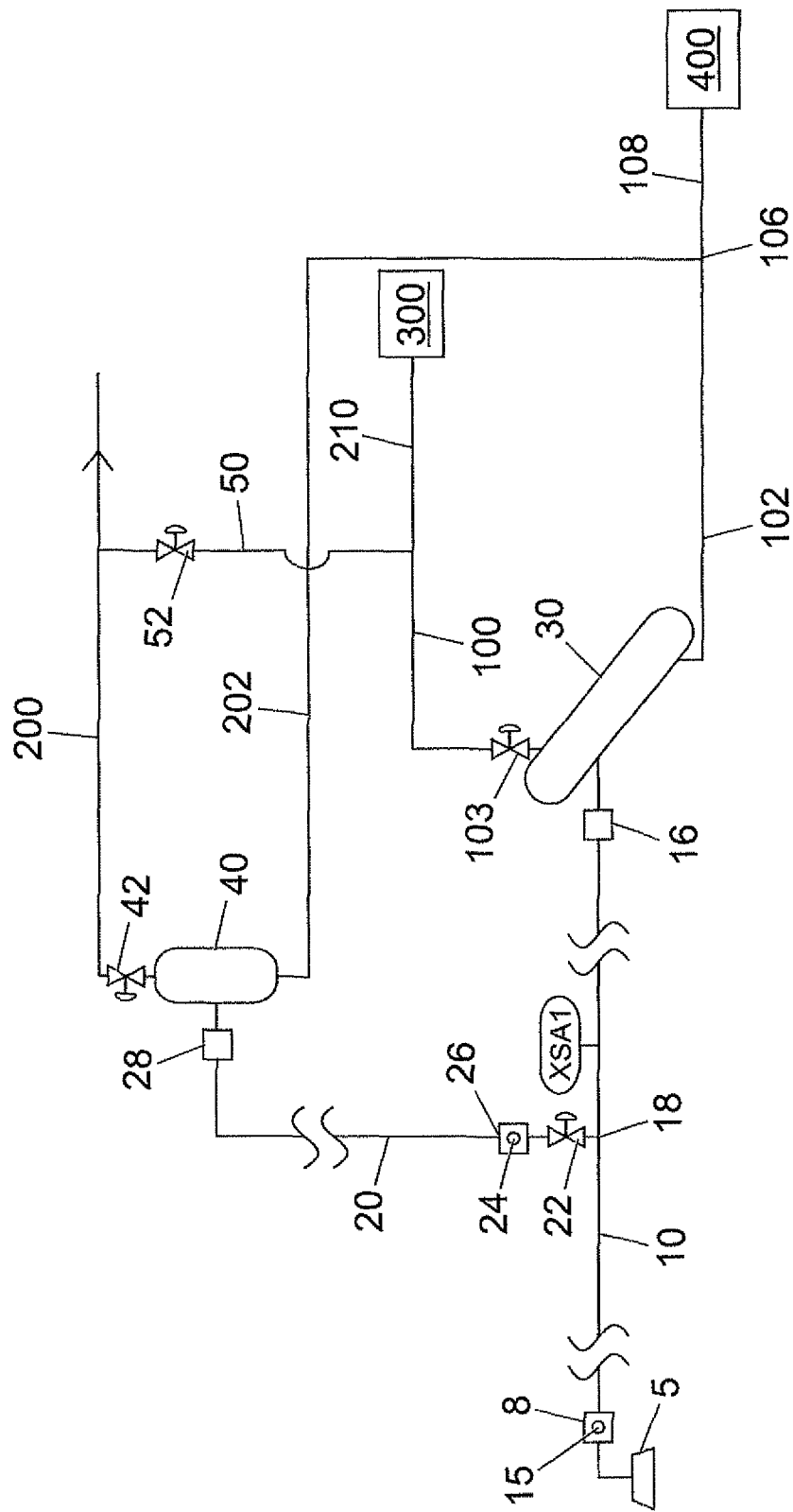
FIG. 1 is a diagrammatic scheme of a method of producing gaseous streams and liquid component streams from a first multi-phase stream in a first pipeline according to one embodiment of the invention.

In one embodiment, a method of producing gaseous and liquid component streams from one or more multi-phase streams in one or more pipelines is disclosed. FIG. 1 shows a schematic diagram including a first multi-phase stream 10, in a first pipeline 10. The first pipeline 10 has at least one upstream end. The at least one first upstream end of the first pipeline may be connected to first well-head manifold 5 of a natural gas field.

The first multi-phase stream 10 may be a hydrocarbon stream, such as a stream comprising hydrocarbon gases, hydrocarbon liquids, water and solids including sand and trace amounts of corrosion products from the pipeline. For instance, the first multi-phase stream may be a natural gas stream, for example a stream transporting natural gas under high pressure from a well-head manifold 5. The natural gas stream may comprise a number of valuable liquid and gaseous components. The liquid components may comprise natural gas liquids (NGLs) such as methane, ethane, propane and butanes, and liquid condensate comprising C5+ hydrocarbons. The gaseous components may comprise predominantly methane (e.g. >80 mol %) with the remainder being ethane, nitrogen, carbon dioxide and other trace gasses. The liquid and gaseous components can be treated to provide natural gas liquids, natural gas, and liquefied natural gas.

As already discussed, the transmission of a multi-phase stream, such as natural gas in a pipeline, particularly when transported on-shore from an off-shore site under high pressure, can lead to the accumulation of the liquid phase slugs in the pipelines. The accumulated liquid slugs can cause problems when the liquid slug enters a compressor or is passed to a gas-processing facility wherein one or more of the components of the multi-phase stream are to be separated or otherwise treated.

In order to mitigate the problems associated with slug formation, first slug catcher system 30 is provided at a first downstream end of the first pipeline 10. Slug catcher systems are well known in the art in connection with the separation of the liquid and gaseous components from multi-phase streams.

The first slugcatcher system includes a first separation vessel 30. Gases in the multi-phase stream 10 are disengaged from the liquid components and move upwardly through the first separation vessel 30 to exit overhead as first gaseous component stream 100. First gaseous component stream 100 can be passed downstream to a gaseous processing facility 300 for further treatment, such as one or more treatments selected from the group comprising: acid gas removal, natural gas liquids (NGLs) extraction and cooling, particularly liquefaction.

The liquid components of the first multi-phase stream 10 move downwardly through the first separation vessel 30 to exit through a bottom portion of the separation vessel 30 as at least one first component stream 102. First liquid component stream 102 may be connected downstream to first liquid processing facility 400, where it can be treated to provide a stabilised condensate stream by the removal of the volatile components by processes known in the art. Such stabilised condensate streams may comprise C5+ hydrocarbons, and preferably have a vapour pressure of below 10 psia.

A first branch pipeline 20 from the first pipeline 10 upstream of the first slugcatcher system 30 provides a first branch multi-phase stream 20. The first branch pipeline 20 can selectively remove the at least a fraction of the first multi-phase stream 10 from the first pipeline 10.

The first branch pipeline 20 is connected to first gas/liquid separator 40. This may be any gas/liquid separator known in the art, including a branch slugcatcher system. Conventional gas/liquid separators are vertical vessels in which gravity causes the liquid components to settle to the bottom of the vessel, from where they are withdrawn. The vapour travels upwards and is removed from towards the top of the vessel. Thus, the first gas/liquid separator can provide an overhead gaseous stream 200 and a bottom liquid stream 202 derived from the first multi-phase stream 10.

The connection of the first branch pipeline 20 to the first pipeline 10 can be achieved in a conventional manner, such as via a barred or sphere tee. The first branch pipeline connection 18 between first branch pipeline 20 and first pipeline 10 is preferably a non-draining connection, such that the first branch pipeline 20 is not connected to the bottom of first pipeline 10. This ensures that the first branch multi-phase stream 20 is not predominantly comprised of liquid.

The entry of the first branch pipeline 20 to the first pipeline 10 can be from the side or overhead, more preferably overhead. In this case, the first branch multi-phase stream 20 may comprise a predominantly gaseous stream.

Figure 2:
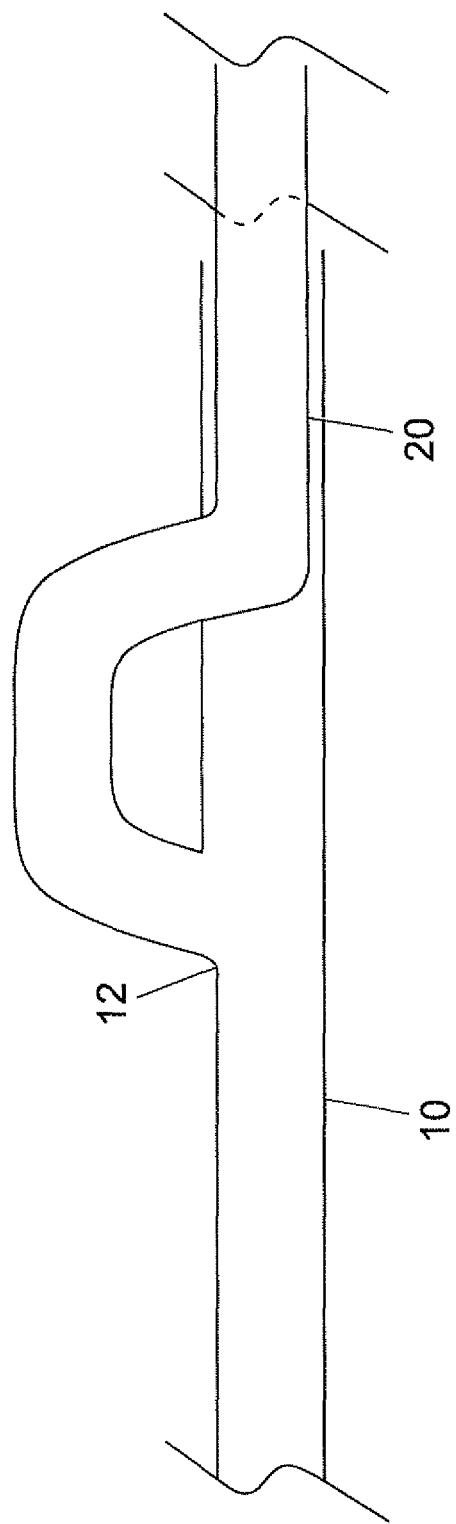
FIG. 2 is a diagrammatic scheme of the junction between a first pipeline and a first branch pipeline according to another embodiment of the invention.

FIG. 2 shows a preferred embodiment of the invention in which the first branch pipeline 20 has an overhead entry 12 to the first pipeline 10. The first branch pipeline 20 can be constructed such that once the first branch multi-phase stream is removed overhead from the first pipeline 10, the first branch pipeline 20 is directed onto the same plane as the first pipeline 10 and can run alongside the first pipeline 10 in the same pipeway.

First branch pipeline 20 contains a first branch pipeline valve 22. The selective opening of first branch valve 22 can allow at least a fraction of the first multi-phase stream 10 to pass along first branch pipeline 20 as first branch multi-phase stream 20. This procedure may be accompanied by a reduction in the flow along the first pipeline downstream of first branch pipeline 20. The reduction in flow may be achieved by closing the first gaseous stream valve 103 as discussed later. First branch pipeline 20 can selectively pass a part or all of the first multi-phase stream 10 from the first pipeline 10 to the first gas/liquid separator 40, for instance when first gaseous stream valve 103 is closed and first branch pipeline valve 22 is opened.

In this way, it is possible to redirect some or all of the first multi-phase stream 10 from the first pipeline 10 to the first branch pipeline 20. The capability to redirect the first multi-phase stream 10 from the first pipeline 10 to the first branch pipeline 20 allows the first slugcatcher system 30 to be taken off-line for maintenance.

The first gaseous component stream 100 from first slugcatcher system 30 and the overhead gaseous stream 200 from the first gas/liquid separator 40 can be selectively combined downstream. For instance, a gaseous stream crossover line 50 may connect the first gaseous component stream 100 to overhead gaseous stream 200. The streams may be merged by opening gaseous stream crossover valve 52 to provide combined gaseous stream 210. In this way, it is possible to maintain a supply of combined gaseous stream 210 to gaseous processing facility 300 from the overhead gaseous stream 200 from the first gas/liquid separator 40, even if the first slugcatcher system 30 is bypassed.

The first liquid component stream 102 from the first slugcatcher system 30 and the bottom liquid stream 202 from the first gas/liquid separator 40 can also be selectively combined, for instance at junction 106, to provide a combined liquid component stream 108, which can be passed to liquid processing facility 400.

The first slugcatcher system 30 should be sized to handle hydrodynamic-, terrain- and flow-induced slugs from the first pipeline 10.

Periodic maintenance of the first pipeline 10 can be carried out by pigging. The pigging operation aids in the accumulation of liquid deposits in the pipelines and the removal of the slug masses.

A pigging operation can generate unusually large slugs of liquid, which are significantly greater in mass than hydrodynamic-, terrain- and flow-induced slugs. Conventionally, slugcatcher systems are sized to handle such large pig-induced slugs. This requires a very large slugcatcher system, incurring significant capital expenditure. However, one advantage of the method and apparatus disclosed herein is that the first slugcatcher system 30 does not have to be sized to accommodate pig-induced slugs from the first pipeline 10.

In particular, first pig 15 can be introduced into first pipeline 10 from first pig launcher 8. The first pig 15 is propelled along the first pipeline 10 by the multi-phase flow, accumulating liquids in the pipeline and pushing the liquids ahead of the first pig 15 as slugs in the direction of flow.

When the first pig 15 has passed the first branch pipeline 20, its presence downstream of the first branch pipeline 20 is detected by first pig signaller XSA1, which is situated downstream of first branch pipeline 20, in first pipeline 10 between the first branch pipeline 20 and the first slugcatcher system 30. The pig signaller XSA1 may be an intrusive signaller, such as a lever or a plunger which intrudes into the first pipeline 10, or may be a non-intrusive signaller, which can remotely sense the pig's presence from outside the pipe wall, for example by a change in the magnetic field if the pig is equipped with a magnet.

First branch pipeline valve 22 will be opened in response to a signal from first pig signaller XSA1 when it has detected the first pig 15, allowing the first multi-phase stream 10 to pass through first branch pipeline 20 and into first gas/liquid separator 40. Because the first pipeline 10 has been recently pigged, removing any liquid deposits, and the first pig-slug mass is downstream of the first branch pipeline 20, the first gas/liquid separator 40 is only required to be sized for the full gas flow of the first pipeline 10, but not the full liquid flow. The requirement for the first gas/liquid separator 40 to handle the full gas flow has only a small effect on cost compared to the liquid storage requirements, and a first gas/liquid separator 40 smaller than the first slugcatcher system 30 can be used.

The first gas/liquid separator 40 can therefore process the first multi-phase stream arriving through the first branch pipeline 20. A portion of the overhead gaseous stream 200 produced by the gas/liquid separator 40 can be redirected along gaseous crossover line 50 to the combined gaseous stream 210 such that the supply of gas to the processing facility 300 can be maintained, when the first pipeline contains the first pig 15 and pig-slug mass downstream of the first branch pipeline 20.

The first branch pipeline 20 must be located far enough upstream of the first slugcatcher system 40 to ensure that the entire first pig-slug mass and first pig 15 can be accommodated in the first pipeline 10 downstream of the first branch pipeline 20 and in the first slugcatcher system 30. For instance, the distance between the first branch pipeline 20 to the first slugcatcher system 10 could be up to 10 km, more preferably in the range of 2 to 8 km.

While the first multi-phase stream is selectively diverted along the first branch pipeline 20, the first slugcatcher system 30 can process the first pig-slug mass. When the first pig-slug mass has been processed, the first pig 15 will reach pig receiver 16 in the vicinity of the first slugcatcher system 30 and be removed from the first pipeline 10. First branch pipeline valve 22 can then be closed and the first multi-phase stream 10 can flow along first pipeline 10 to first slugcatcher system 30 for processing.

FIG. 1 also shows an embodiment in which the first branch pipeline 20 can be pigged. In this case, a first branch pig 24 is introduced into first branch pipeline 20 from first branch pig launcher 26. First branch valve 22 is opened and the first branch pig 24 is propelled along the first branch pipeline 20 by the first multi-phase stream from the first pipeline 10, accumulating liquids in the first branch pipeline 20 and pushing the liquids ahead of the first branch pig 24 as slugs in the direction of flow.

The first gas/liquid separator 40 is capable of processing the first branch pig-slug mass to provide a bottom liquid stream 202 and gaseous overhead stream 200. The size of the first branch pig-slug mass can be small compared to the size of the first pig-slug mass because the length of the first branch pipeline 20 may be small compared to that of the first pipeline 10.

When the first branch pig 24 is in the vicinity of the first gas/liquid separator 40, it is captured by first branch pig receiver 28 and removed from the first branch pipeline 20. First branch valve 22 can then be closed until such time as the first pipeline is pigged and the first pig 15 is downstream of the first branch pipeline connection 18 between first branch pipeline 20 and first pipeline 10.

In addition, the presently disclosed embodiment has been designed to reduce the likelihood of bulk liquids leaving the first pipeline 10 and entering the first branch pipeline 20. During normal operation, when first multi-phase stream 10 is flowing through the first pipeline 10, bulk liquids in the first multi-phase stream 10 cannot enter the first branch pipeline 20 because the first branch valve 22 will be closed. First branch valve 22 is only opened when a first pig 15 has passed first branch pipeline connection 18, as indicated by first pig signaller XSA1. After the first branch valve 22 has been opened, the bulk liquid component of first multi-phase stream 10 at first branch pipeline connection 18 will be very small, because the first pipeline 10 upstream of the first branch pipeline 20 will have been emptied of liquids by the first pig 15. In addition, the first pipeline 10 upstream of the first branch pipeline 20 will be retaining liquids upstream of the first branch pipeline connection 18 while an equilibrium between the gaseous and liquid components of the first multi-phase stream 10 is being re-established within the first pipeline 10.

Figure 3:
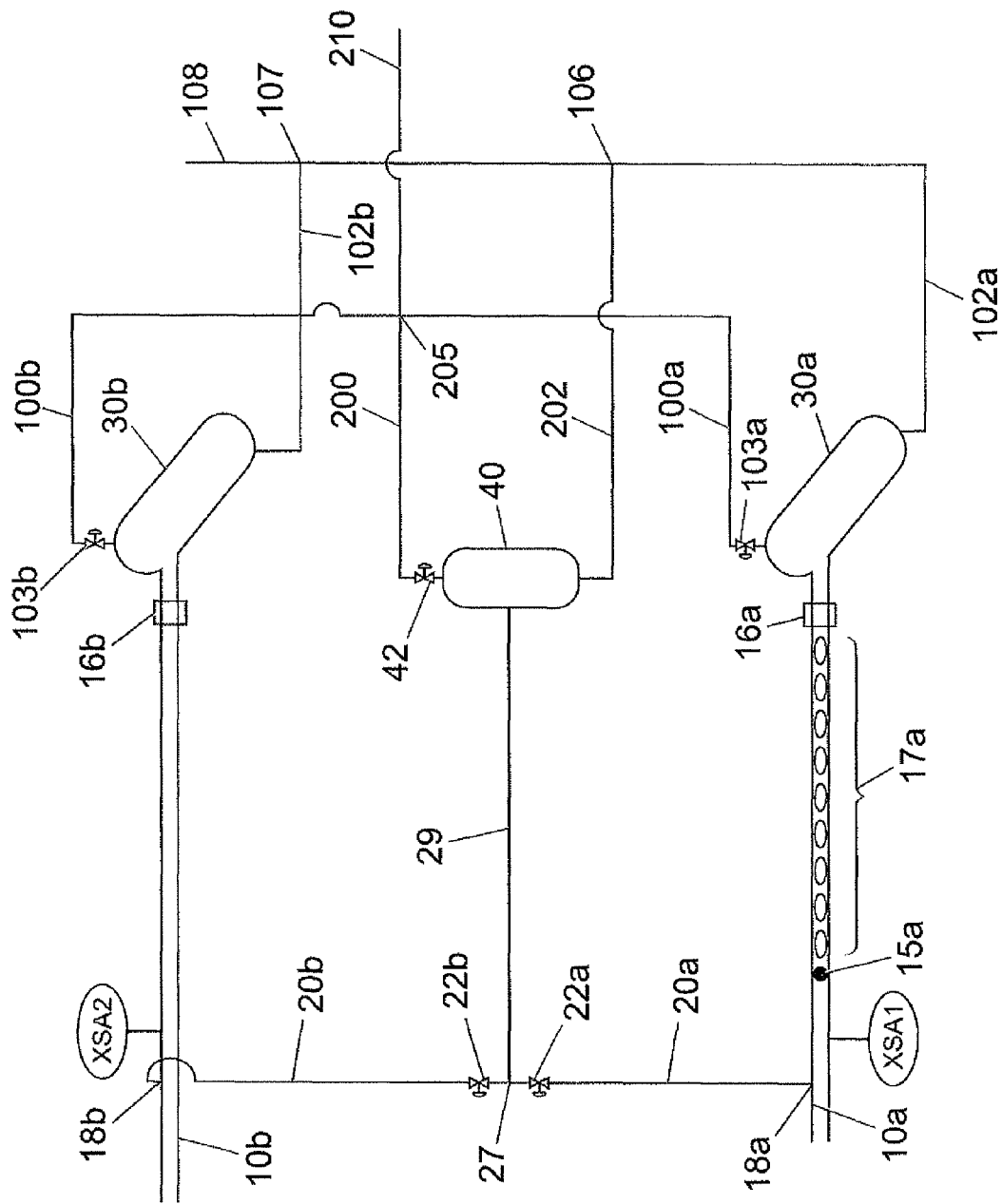
FIG. 3 is a diagrammatic scheme of a method of producing gaseous and liquid component streams from two multi-phase streams in at least two pipelines with two slugcatcher systems according to another embodiment of the invention.

FIG. 3 shows a schematic diagram of a further embodiment in which gaseous and liquid component streams are produced from two multi-phase streams in two pipelines. A first multi-phase stream 10a in a first pipeline 10a is passed to a first slugcatcher system 30a. A second multi-phase stream 10b in a second pipeline 10b is passed a second slugcatcher system 30b. First and second slugcatcher systems 30a, 30b process the multi-phase streams to provide first and second gaseous component streams 100a, 100b and first and second liquid component streams 102a, 102b respectively.

The first and second slugcatcher systems 30a, 30b are sized to handle hydrodynamic-, terrain- and flow-induced slugs from the first and second multi-phase streams 10a, 10b respectively. The first and second slugcatcher systems 30a, 30b are thus of appropriate capacities to handle the gas flow of the first and second multi-phase streams 10a, 10b, respectively, and the relatively small slugs associated with hydrodynamic-, terrain- and flow-induced effects from the first and second pipelines 10a, 10b respectively.

A first branch pipeline 20a is connected to first pipeline 10a at first branch pipeline connection 18a upstream of first slugcatcher system 30a. First branch pipeline 20a contains a first branch valve 22a and can selectively pass at least a fraction, preferably all of the first multiphase stream 10a downstream to first gas/liquid separator 40. The first gas/liquid separator 40 may be any known in the art, including a branch slugcatcher system, such as those discussed previously in relation to FIG. 1.

A second branch pipeline 20b is connected to second pipeline 10b at second branch pipeline connection 18b upstream of second slugcatcher system 30b. Second branch pipeline 20b contains a second branch valve 22b and can selectively pass at least a fraction, preferably all of the second multiphase stream 10b downstream to first gas/liquid separator 40. First and second branch pipelines 20a, 20b can merge at junction 27 and can pass combined the first and second multi-phase streams 10a, 10b to the gas/liquid separator along combined multi-phase stream line 29.

The first gas/liquid separator 40 produces an overhead gaseous stream 200 and a bottom liquid stream 202. The overhead gaseous stream 200 can be combined with the first and second gaseous component streams 100a, 100b from the first and second slugcatcher systems 30a, 30b respectively at a junction 205 to provide a combined gaseous stream 210. Similarly, the bottom liquid stream 202 from first gas/liquid separator 40 can be combined with the first liquid component stream 102a at junction 106, and subsequently combined with the second liquid component stream 102b at junction 107 to provide a combined liquid component stream 108.

The first gas/liquid separator 40 can be brought on-line when one or other of the first and second pipelines 10a, 10b is being pigged. Taking the pigging of first pipeline 10a as an example, a first pig 15a can be introduced into first pipeline 10 and can travel along the pipeline accumulating a first pig-slug mass 17a. Once the first pig 15a has passed the first branch pipeline connection 18a with the first branch pipeline 20a, which is preferably an overhead connection as shown in FIG. 2, it will be detected by the first pig signaller XSA1.

First branch pipeline valve 22a can be opened in response to the signal, allowing the first multi-phase stream 10a to pass through the first branch pipeline 20a and downstream to the first gas/liquid separator 40. In order to prevent back-filling of the second pipeline 10b by the first multi-phase stream 10a via the second branch pipeline 20b, second branch valve 22b will remain shut. Consequently, the flow of the second pipeline 20b can be maintained uninterrupted, with the second multi-phase stream 10b continuing to be processed by the second slugcatcher system 30b.

First pig-slug mass 17a can be stored in the first pipeline 10a downstream of first branch pipeline 20a while the first slugcatcher system 30a is processing the slug. Preferably, the total volume of the first pipeline 10a between the first branch pipeline 20a and the first slugcatcher system 30a plus the volume of the first slugcatcher system 30a should be greater than the total volume of the first pig 15a plus the first pig-slug mass 17a. More preferably, the volume of the first pipeline 10a between the first branch pipeline 20a and the first slugcatcher system 30a should be greater than the total volume of the first pig-slug mass 17a.

The high liquid level in the first separation vessel 30a of the first slugcatcher system 30a caused by the arrival of the first pig-slug mass 17a will cause the first gaseous component stream valve 103a to close. This will reduce the velocity of the fluid in the pigged first pipeline 10a downstream of first branch pipeline 20a. This process allows the liquid level in the first separation vessel 30a of the first slugcatcher system 30a to remain constant while the first pig-slug mass 17a is process to provide first liquid component stream 102a.

Once the first pig-slug mass 17a has been processed by the first slugcatcher system 30a, the liquid level within the first separation vessel 30a will drop, returning to normal levels. First gaseous stream valve 103a can then be reopened and first pig 15a can be captured by first pig receiver 16a as it nears the first slugcatcher system 30a. First branch valve 22a can then be closed and the first multi-phase stream 10a returned to flow along first pipeline 10a downstream of first branch pipeline 20a to first slugcatcher system 30a.

It will be apparent that maintenance of the second pipeline 10b can be carried out by pigging in a similar manner to that described above. The second multi-phase stream 10b can be diverted along the second branch pipeline 20b to the first gas/liquid separator 40 when the second pig (not shown) has passed the second pig signaller XSA2 downstream of the second branch pipeline 20b, between the second branch pipeline 20b and the second slugcatcher system 30b. The second pig-slug mass accommodated in the second pipeline 10b downstream of the second branch pipeline 20b can then be processed by the second slugcatcher system 30b, while the second multi-phase stream 10b is processed by the first gas/liquid separator 40. The second pig can be captured by second pig-receiver 16b when sufficient second pig-slug mass has been processed by the first gas/liquid separator 40 such that the second pig can reach the second pig-receiver 16b.

In this way, the requirement for a large slugcatcher system is avoided by storing the pig generated slugs in the first or second pipeline 10a, 10b downstream of the first or second branch pipelines 20a, 20b respectively. The provision of first and second branch pipelines 20a, 20b allows the reduction in the size of the first and second slugcatcher systems 30a, 30b because the large pig-induced slugs of liquid can be retained in the pipeline awaiting processing by the slugcatcher system. The first and second slugcatcher systems 30a, 30b thus require smaller liquid storage capacities. This configuration allows full production of the gas processing facilities to be maintained and provides significant capital expenditure savings by eliminating the requirement for large slugcatcher systems. A further advantage is the reduction of the risks associated with containing large inventories of high pressure hydrocarbons in the downstream processing facilities.

Furthermore, in a similar manner to the embodiment of FIG. 1, because the first or second pipeline has been recently pigged, removing any liquid deposits, and the pig-slug mass is downstream of the branch pipeline, the first gas/liquid separator 40 is only required to be sized for the full gas flow of the first or second multi-phase stream 10a, 10b, but not the full liquid flow, providing significant capital expenditure savings.

Figure 4:
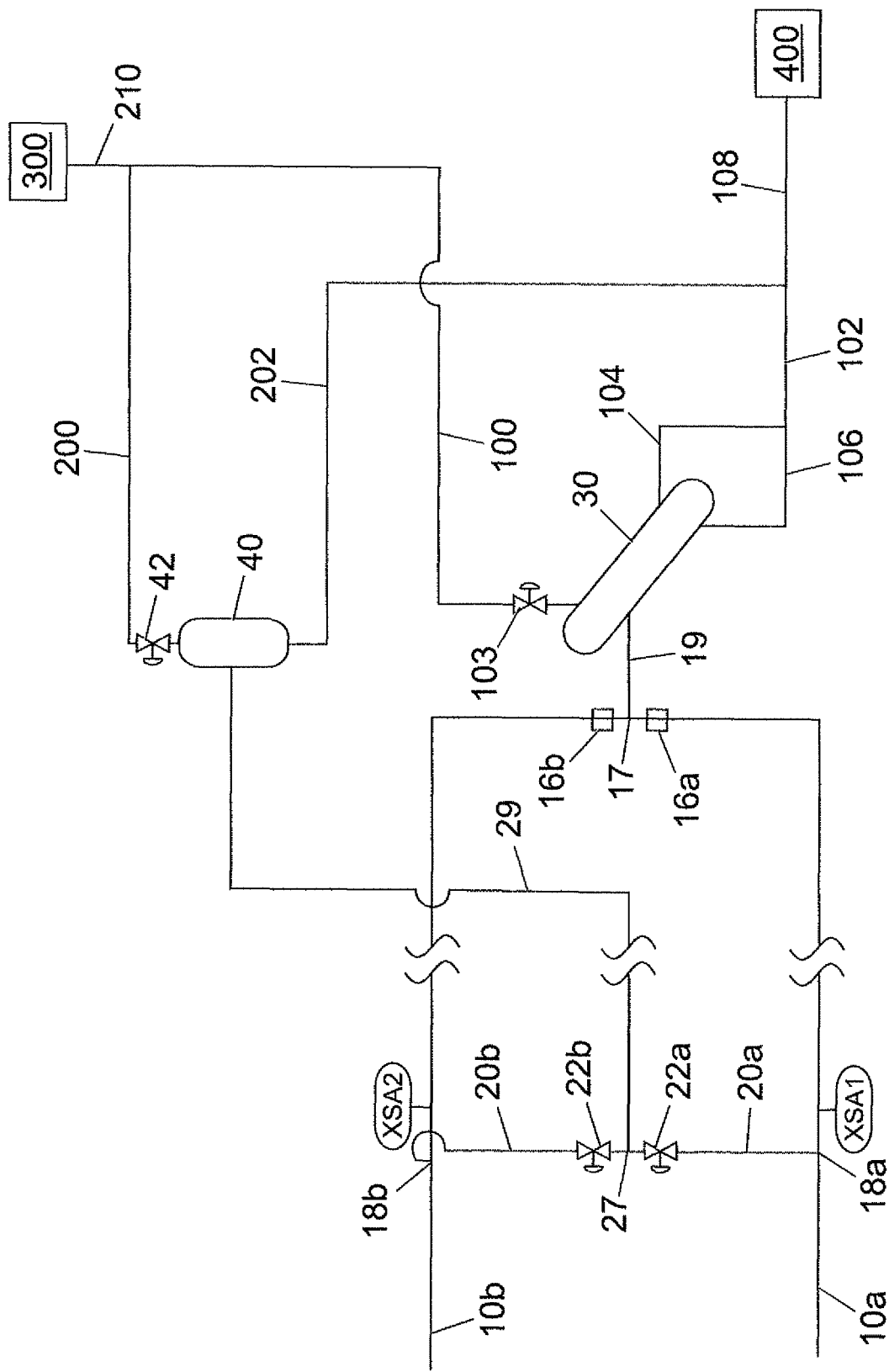
FIG. 4 is a diagrammatic scheme of a method of producing gaseous and liquid component streams from two multi-phase streams in at least two pipelines sharing a single slugcatcher system according to another embodiment of the invention.

FIG. 4 shows a schematic diagram of a further embodiment in which gaseous and liquid component streams are produced from two multi-phase streams in two pipelines. A first multi-phase stream 10a in a first pipeline 10a is passed to a junction 17. A second multi-phase stream 10b in a second pipeline 10b is passed to junction 17 where it is combined with the first multi-phase stream 10a to form a combined multi-phase stream 19 which is passed to first slugcatcher system 30. As discussed for FIG. 1, first slugcatcher system 30 processes the multi-phase stream to provide a first gaseous component stream 100 and a first liquid component stream 102.

The first slugcatcher system 30 is sized to handle hydrodynamic-, terrain- and flow-induced slugs from the combined multi-phase stream 19. The first slugcatcher system 30 is thus of an appropriate capacity to handle the combined gas flow of the first and second multi-phase streams 10a, 10b, and the relatively small slugs associated with hydrodynamic-, terrain- and flow-induced effects from both first and second pipelines 10a, 10b.

A first branch pipeline 20a containing a first branch valve 22b is connected to first pipeline 10a at first branch pipeline connection 18a upstream of the first slugcatcher system 30. First branch pipeline 20a can pass at least a fraction, preferably all, of the first multi-phase stream 10a downstream to a first gas/liquid separator 40. A second branch pipeline 20b containing a second branch valve 22b is connected to second pipeline 10b at second branch pipeline connection 18b upstream of first slugcatcher system 30. Second branch pipeline 20b can pass at least a fraction, preferably all, of the second multiphase stream 10b downstream to first gas/liquid separator 40. First and second branch pipelines 20a, 20b merge at junction 27 and can pass combined the first and second multi-phase streams 10a, 10b to the first gas/liquid separator along combined multi-phase stream line 29.

The first gas/liquid separator 40 can be any separator of the form discussed above, including a branch slugcatcher system. The first gas/liquid separator 40 can be brought on-line when one or other of the first and second pipelines 10a, 10b is being pigged. For example, when a first pig in the first pipeline 10a has passed the first branch pipeline 20a, it will be detected by the first pig signaller XSA1. First branch pipeline valve 22a will be opened allowing the first multi-phase stream 10a to pass through the first branch pipeline 10a and downstream to the gas/liquid separator 40.

In this embodiment, the first slugcatcher system 30 is shared between the first and second pipelines 10a, 10b. After the first pig has reached first pig-signaller XSA1, the first slugcatcher system 30 will be processing the first pipeline pig-slug held in the first pipeline 10a downstream of first branch line 20a. However, the first slugcatcher system 30 will still be available to process the second multi-phase stream 10b after the first pig-slug mass has reached the first slugcatcher system. Consequently, second branch line 10b can continue to operate as normal by passing second multi-phase stream 10b to first slugcatcher system 30. First slugcatcher system 30 will be sized such that after receiving the first pipeline pig-slug mass, it can retain sufficient capacity to process hydrodynamic-, terrain- and flow-induced slugs from the second pipeline 10b. The first pig-slug mass will be almost entirely contained in first pipeline 10a, downstream of first junction 18a with first branch line 20a. The level control system in first slugcatcher system 30 should control the quantity of liquid in the first slugcatcher system 30 to produce a sufficiently low liquid level to provide capacity for non pig-induced slugs from the second pipeline 10b.

At high liquid levels within the first slugcatcher system 30, first gaseous stream valve 103 can be partially closed, thus slowing the progress of the first pig-slug mass in the first pipeline 10a downstream of first junction 18a. This is because, when first branch valve 22a is open and second branch valve 22b is closed, the driving force over the first pig-slug mass will be controlled by the pressure in first slugcatcher system 30 versus the pressure in gas/liquid separator 40. By partially closing first gaseous stream valve 103, the pressure within the first slugcatcher system 30 will be increased, slowing the progress of the first pig-slug mass.

As already discussed for the previous embodiments, the high liquid level in the first slugcatcher system 30 caused by the arrival of the first pig-slug mass will lead to the partial closure of first gaseous stream valve 103, reducing the velocity of the fluid in the first pipeline 10a downstream of the first branch line 20a. Once the first slugcatcher system 30 has completed processing the first pipeline pig-induced slug, first gaseous stream valve 103 can then be reopened and the first pig can be captured by first pig receiver 16a as it nears the first slugcatcher system 30. First branch valve 22a can then be closed and the first multi-phase stream 10a can be redirected along first pipeline 10a downstream of first branch pipeline 20a to first slugcatcher system 30.

The gas/liquid separator 40 can be sized to process the gaseous flow from either the first or second multi-phase streams 10a, 10b at any one time. The gas/liquid separator 40 should also be capable of processing the liquid flow from either the pigged first or second multi-phase streams 10a, 10b at any one time. For instance, when the first pipeline 10a has been recently pigged, the liquid content of the first multi-phase stream 10a passed to the gas/liquid separator 40 following the first pig will be low. A similar situation will occur after the pigging of the second pipeline 10b. Consequently, the liquid handling capacity of the gas/liquid separator 40 can be smaller than the first slugcatcher system 30, leading to savings in capital expenditure.

In a further embodiment, combined gaseous stream 210 from the overhead gaseous stream 200 of the first gas/liquid separator 40 and the first gaseous component stream 100 of the first slugcatcher system 30 can be passed to a gaseous processing facility 300 for further treatment, such as one or more treatments selected from the group comprising: acid gas removal, natural gas liquids (NGL) extraction and cooling, particularly liquefaction.

Gaseous component processing facility 300 can treat any suitable first gaseous component stream 100 or overhead gaseous stream 200 obtained from the first slugcatcher system 30 or first gas/liquid separator 40 respectively, such as, but not limited to, a hydrocarbon stream, particularly a natural gas stream obtained from a natural gas or petroleum reservoir.

Usually the combined gaseous stream 210 is comprised substantially of methane. Preferably the combined gaseous component stream comprises at least 50 mol % methane, more preferably at least 80 mol % methane. Depending on the source, the combined gaseous component stream 120 may contain one or more non-hydrocarbons such as $H_2O$, $N_2$, $CO_2$, Hg, $H_2S$ and other sulfur compounds.

If desired, the combined gaseous stream 210 may be pre-treated, either as part of a hydrocarbon cooling process, or separately to provide a treated gaseous component stream. This pre-treatment may comprise reduction and/or removal of non-hydrocarbons such as so-called acid gasses $CO_2$ and $H_2S$ or other steps such as early cooling and pre-pressurizing. As these steps are well known to the person skilled in the art, their mechanisms are not further discussed here.

Preferably, the combined gaseous stream 210 used herein undergoes at least the minimum pre-treatment required to subsequently allow liquefaction of the gaseous component stream. Such a requirement for liquefying natural gas is known in the art.

A hydrocarbon gaseous stream commonly also contains varying amounts of hydrocarbons heavier than methane such as ethane, propane, butanes and pentanes, as well as some aromatic hydrocarbons. The composition varies depending upon the type and location of the gaseous component stream such as natural gas. Hydrocarbons heavier than methane generally need to be removed from natural gas to be liquefied for several reasons, such as having different freezing or liquefaction temperatures that may cause them to block parts of a methane liquefaction plant. C2-4 hydrocarbons can be used as a source of natural gas liquids (NGLs) and/or refrigerant.

Removal of hydrocarbons heavier than methane can be carried out in a NGL recovery system to provide a methane-enriched stream and an NGL stream in a manner known in the art. The methane-enriched stream may still comprise a minor (<10 mol %) amount of C2+ hydrocarbons, and is preferably >80 mol %, more preferably >90 mol %, methane and nitrogen.

The methane-enriched stream can be compressed and liquefied by one or more cooling stages comprising one or more heat exchangers. The liquefied hydrocarbon product can then be passed to storage and/or transportation facilities. Where the combined gaseous stream 210 is natural gas, the liquefied hydrocarbon product is LNG.

End-flash gas from the end gas/liquid separator of a liquefaction process can be passed through one or more end-compressors to provide an end-compressed stream, such as a natural gas stream.

In a further embodiment shown in FIG. 4, the first slugcatcher system 30 may provide additional separation of the first and second multi-phase streams 10*a*, 10*b*. Two first liquid streams 104, 106 can exit the bottom portion of the first separation vessel 30. For instance, upper first liquid stream 104 may be a partially stabilised condensate stream, while lower first liquid stream 106 may be a water stream. The upper and lower first liquid streams 104, 106 may be combined into first liquid component stream 102 and passed to liquid processing facility 400 along combined liquid stream 108. Liquid processing facility 400 may be a condensate/stabilisation/treatment plant which can provide stabilised condensate.

The person skilled in the art will understand that the present invention can be carried out in many various ways without departing from the scope of the appended claims. For instance, a plurality of pipelines connected to a plurality of slugcatcher systems and having a plurality of branchlines connected to a plurality of gas/liquid separators fall within the scope of the present invention. For example, three pipelines having one, two or three slugcatcher systems may share one or two gas/liquid separators.

What is claimed is:

1. A method of producing gaseous and liquid components from one or more multi-phase streams in one or more pipelines comprising the steps of:
   (a) passing a first multi-phase stream along a first pipeline;
   (b) passing the first multi-phase stream through a first slugcatcher system to provide a first gaseous component stream and at least one first liquid component stream;
   (c) selectively opening a first branch pipeline from the first pipeline upstream of the first slugcatcher system to pass at least a fraction of the first multi-phase stream through the first branch pipeline to provide a first branch multi-phase stream; and
   (d) passing at least a fraction of the first branch multi-phase stream to a first gas/liquid separator to provide an overhead gaseous stream and a bottom liquid stream;
   wherein at least a first pig is passed down at least the first pipeline to create at least one pig-slug mass, and at least the first branch pipeline is selectively opened when the at least first pig is downstream of at least the first branch pipeline.

2. A method as claimed in claim 1, wherein the first pipeline comprises a first pig signaller between the first branch pipeline and the first slugcatcher system, and the first branch pipeline is opened when the first pig signaller detects the first pig.

3. A method as claimed in claim 1, wherein the volume of at least the first pipeline between at least the first branch pipeline and at least the first slugcatcher system is the same or greater than the volume of the first pig-slug mass in at least the first pipeline.

4. A method as claimed in claim 1 wherein the first branch pipeline is a non-draining branch-pipeline.

5. A method as claimed in claim 1 wherein the first branch pipeline is connected overhead to the first pipeline.

6. A method as claimed in claim 1 further comprising the steps of:
   (e) passing a second multi-phase stream along a second pipeline;
   (f) passing the second multi-phase stream through the first slugcatcher system;
   (g) selectively opening a second branch pipeline from the second pipeline upstream of the first slugcatcher system to pass at least a fraction of the second multi-phase stream through the second branch pipeline to provide a second branch multi-phase stream; and
   (h) passing at least a fraction of the second branch multi-phase stream to the first gas/liquid separator.

7. A method as claimed in claim 1 further comprising the steps of:
   (e) passing a second multi-phase stream along a second pipeline;
   (f) passing the second multi-phase stream through a second slugcatcher system to provide a second gaseous component stream and at least on second liquid component stream;
   (g) selectively opening a second branch pipeline from the second pipeline upstream of the second slugcatcher system to pass at least a fraction of the second multi-phase stream through the second branch pipeline to provide a second branch multi-phase stream; and
   (h) passing at least a fraction of the second branch multi-phase stream to the first gas/liquid separator.

8. A method as claimed in claim 1 further comprising the step of:
   (i) reducing the flow of at least the first multi-phase stream along at least the first pipeline downstream of at least the first branch pipeline during step (c).

9. A method as claimed in claim 1 wherein at least the first gaseous component stream and overhead gaseous stream are selectively combined downstream of at least the first slugcatcher system and gas/liquid separator to provide a combined gaseous stream.

10. A method as claimed in claim 9 further comprising treating the combined gaseous stream,
   wherein the treating comprises recovering one of more components of the combined gaseous stream,
   wherein the one or more components are selected from the group consisting of natural gas, natural gas liquids and stabilised condensate, and
   wherein the treating comprises cooling and liquefying one or more of said components.

11. An apparatus for producing gaseous and liquid components from one or more multi-phase streams in one or more pipelines, the apparatus comprising:
   (a) a first pipeline for carrying a first multi-phase stream connected downstream to a first slugcatcher system for separating and recovering a first gaseous component as a first gaseous component stream and at least a first liquid component as at least a first liquid component stream from at least the first multi-phase stream; and
   (b) a first branch pipeline from the first pipeline upstream of the first slugcatcher system able to selectively pass at least a fraction of the first multi-phase stream from the first pipeline to a first gas/liquid separator for providing an overhead gaseous stream and a bottom liquid stream from at least the first multi-phase stream;

wherein the volume of at least the first pipeline between at least the first branch pipeline and at least the first slugcatcher system is the same or greater than the volume of a first pig-slug mass produced by pigging at least the first pipeline.

12. An apparatus as claimed in claim 11, wherein at least the first gaseous component stream and the overhead gaseous stream are connected downstream of at least the first slugcatcher system and the gas/liquid separator.

13. An apparatus as claimed in claim 11, further comprising at least a first pig signaller in at least the first pipeline between the first branch pipeline and the first slugcatcher system.

14. An apparatus as claimed in claim 11, wherein the first branch pipeline is a non-draining branch-pipeline.

15. An apparatus as claimed in claim 11, wherein the first branch pipeline is connected overhead to the first pipeline.

16. An apparatus as claimed in claim 11 further comprising:
(c) a second pipeline able to carry a second multi-phase stream connected downstream to the first slugcatcher system, said first slugcatcher system able to separate the first gaseous component as a first gaseous component stream and at least the first liquid component as at least a first liquid component stream from the first and second multi-phase streams; and
(d) a second branch pipeline from the second pipeline upstream of the first slugcatcher system able to selectively pass at least a fraction of the second multi-phase stream from the second pipeline to the first gas/liquid separator, said gas/liquid separator able to provide an overhead gaseous stream and a bottom liquid stream from the first and second multi-phase streams.

17. An apparatus as claimed in claim 11 further comprising:
(c) a second pipeline for carrying a second multi-phase stream connected downstream to a second slugcatcher system for separating a second gaseous component as a second gaseous component stream and at least a second liquid component as at least a second liquid component stream from the second multi-phase stream; and
(d) a second branch pipeline from the second pipeline upstream of the second slugcatcher system for selectively passing at least a fraction of the second multi-phase stream from the second pipeline to the first gas/liquid separator to provide an overhead gaseous stream and a bottom liquid stream from the first and second multi-phase streams.

18. A method of producing gaseous and liquid components from one or more multi-phase streams in one or more pipelines comprising the steps of:
(a) passing a first multi-phase stream along a first pipeline;
(b) passing the first multi-phase stream through a first slugcatcher system to provide a first gaseous component stream and at least one first liquid component stream;
(c) selectively opening a first branch pipeline from the first pipeline upstream of the first slugcatcher system to pass at least a fraction of the first multi-phase stream through the first branch pipeline to provide a first branch multi-phase stream;
reducing the flow of at least the first multi-phase stream along at least the first pipeline downstream of at least the first branch pipeline during step (c); and
(d) passing at least a fraction of the first branch multi-phase stream to a first gas/liquid separator to provide an overhead gaseous stream and a bottom liquid stream.

19. The method as claimed in claim 18 wherein at least the first gaseous component stream and overhead gaseous stream are selectively combined downstream of at least the first slugcatcher system and gas/liquid separator to provide a combined gaseous stream.

20. The method as claimed in claim 19 further comprising treating the combined gaseous stream,
wherein the treating comprises recovering one of more components of the combined gaseous stream,
wherein the one or more components are selected from the group consisting of natural gas, natural gas liquids and stabilised condensate, and
wherein the treating comprises cooling and liquefying one or more of said components.

* * * * *